United States Patent
Susca et al.

(10) Patent No.: US 12,454,950 B2
(45) Date of Patent: Oct. 28, 2025

(54) DIRECT CONTROL FOR VARIABLE DISPLACEMENT PUMPS USING A BYPASS VALVE AND A MINIMUM PRESSURE SHUTOFF VALVE

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 254 days.

(21) Appl. No.: 18/096,971

(22) Filed: Jan. 13, 2023

(65) Prior Publication Data
US 2024/0240631 A1    Jul. 18, 2024

(51) Int. Cl.
*F04B 49/24* (2006.01)
*F04B 49/00* (2006.01)

(52) U.S. Cl.
CPC ............ *F04B 49/24* (2013.01); *F04B 49/002* (2013.01)

(58) Field of Classification Search
CPC ...... F04B 49/002; F04B 49/22; F04B 49/035; F04B 49/24; F04B 49/246; F04B 2205/05; F04C 14/26
See application file for complete search history.

(56) References Cited

U.S. PATENT DOCUMENTS

| | | | |
|---|---|---|---|
| 6,102,001 A | 8/2000 | McLevige | |
| 6,584,762 B2 | 7/2003 | Snow et al. | |
| 8,192,172 B2 | 6/2012 | Baker et al. | |
| 8,348,630 B2 * | 1/2013 | Tysver | F02C 9/30 417/220 |
| 8,584,441 B2 | 11/2013 | Benson | |
| 8,869,509 B2 | 10/2014 | Baker | |
| 2003/0074884 A1 | 4/2003 | Snow et al. | |
| 2003/0192300 A1 | 10/2003 | Mahoney et al. | |
| 2005/0072160 A1 * | 4/2005 | Futa, Jr. | F02C 9/36 60/773 |
| 2005/0284148 A1 | 12/2005 | Wernberg et al. | |
| 2008/0067463 A1 | 3/2008 | Jones et al. | |
| 2010/0037961 A1 * | 2/2010 | Tysver | F02C 7/22 60/734 |
| 2012/0315152 A1 | 12/2012 | Baker | |
| 2015/0226170 A1 | 8/2015 | Snodgrass et al. | |
| 2016/0320114 A1 * | 11/2016 | Ito | G01F 15/005 |

(Continued)

OTHER PUBLICATIONS

Extended European Search Report dated Mar. 15, 2024, for corresponding European Patent Application No. 24151641.8.

*Primary Examiner* — Nathan C Zollinger
(74) *Attorney, Agent, or Firm* — Kinney & Lange, P.A.

(57) ABSTRACT

A system includes a variable displacement pump (VDP) in fluid communication with an inlet line and with an outlet line. The VDP includes a variable displacement mechanism configured to vary pressure to the outlet line. A bypass valve (BPV) includes a BPV inlet in fluid communication with the outlet line, and a BPV outlet in fluid communication with a bypass line that feeds into the inlet line upstream of the VDP. A minimum pressure shutoff valve (MPSOV) is connected in fluid communication with the outlet line, configured to block flow through the outlet line for shutoff. The MPSOV is connected in fluid communication with the BPV for triggering recirculation through the BPV.

20 Claims, 2 Drawing Sheets

(56) References Cited

U.S. PATENT DOCUMENTS

2018/0340501 A1   11/2018  Ni et al.
2022/0307491 A1    9/2022  Rutar
2024/0183352 A1*   6/2024  Shook .................. F04B 49/065

* cited by examiner

DIRECT CONTROL FOR VARIABLE DISPLACEMENT PUMPS USING A BYPASS VALVE AND A MINIMUM PRESSURE SHUTOFF VALVE

BACKGROUND

1. Field

The present disclosure relates to pump control, and more particularly to control for variable displacement pumps (VDPs).

2. Description of Related Art

In a pump, the turn-down ratio is the ratio of the pump's maximum flow to its minimum flow. In fuel delivery systems using a variable displacement pump (VDP), often the pump is subject to a high turn-down ratio. This can drive a pump design with a less than optimal pump efficiency throughout the operating range as a tradeoff for ensuring the turn-down ratio needed. For example, it is beneficial to pump design to minimize this turn-down ratio to be less than 4:1. But large displacement VDPs can struggle to function with such high turn down ratios in typical fuel metering systems because minimum pump pressure flows to support cooling the VDP are typically higher than the lowest flow for fuel burners, e.g. in gas turbine engines such as on aircraft.

The conventional techniques have been considered satisfactory for their intended purpose. However, there is an ever present need for improved systems and methods for control of VDPs. This disclosure provides a solution for this need.

SUMMARY

A system includes a variable displacement pump (VDP) in fluid communication with an inlet line and with an outlet line. The VDP includes a variable displacement mechanism configured to vary pressure to the outlet line. A bypass valve (BPV) includes a BPV inlet in fluid communication with the outlet line, and a BPV outlet in fluid communication with a bypass line that feeds into the inlet line upstream of the VDP. A minimum pressure shutoff valve (MPSOV) is connected in fluid communication with the outlet line, configured to block flow through the outlet line for shutoff. The MPSOV is connected in fluid communication with the BPV for triggering recirculation through the BPV. The BPV outlet can be the only outlet of the BPV so all flow through the BPV is supplied to the BPV outlet.

An actuator can be operatively connected to control the BPV to vary flow from the BPV inlet to the bypass line. A flow sensing valve (FSV) can be connected in the outlet line, wherein the FSV includes a sensor configured to generate sensor data indicative of flow out of the outlet line. A controller can be operatively connected to the actuator to control recirculation flow passed through the BPV based on the sensor data and based on a predetermined low threshold of flow through the VDP.

The controller can be configured to control the BPV to maintain a baseline flow through the BPV under a first condition wherein requested flow from the downstream system is above than the predetermined low threshold, and to control the BPV to increase the flow through the BPV above the baseline flow for a second flow condition wherein requested flow from the downstream system is at or below the predetermined low threshold.

A first electrohydraulic servo valve (EHSV) can be connected in fluid communication with the BPV by a first control line. The first EHSV can be connected in fluid communication with both the inlet line and with the outlet line through respective connection lines. The first EHSV can be operatively connected to the controller for active control of the first EHSV to actuate the BPV. A first MPSOV line can connect the MPSOV to the first control line for fluid communication. A second MPSOV line can connect the MPSOV to the inlet line for fluid communication. An MPSOV control line can connect the MPSOV in fluid communication with the inlet line through a fixed throttle. A solenoid valve (SOL) can be connected in fluid communication with the outlet line and with the MPSOV control line for actuating the MPSOV between first and second states. The MPSOV can include an MPSOV valve member with a first position in the MPOV that connects the first and second MPSOV lines in fluid communication and blocks flow through the outlet line, and a second position that blocks fluid communication of the first and second MPSOV lines and allows flow though the outlet line.

A first position sensor can be operatively connected to the BPV to provide sensor output indicative of position of a valve member of the BPV. The first position sensor can be operatively connect the controller to provide feedback for controlling the BPV. A second EHSV ban be connected in fluid communication with the variable displacement mechanism by a second control line for control of flow through the VDP. The second EHSV can be connected in fluid communication with both the inlet line and with the outlet line through respective connection lines. The second EHSV can be operatively connected to the controller for active control of the second EHSV to actuate the variable displacement mechanism.

A second position sensor can be operatively connected to the variable displacement mechanism to provide sensor output indicative of position of the variable displacement mechanism. The second position sensor can be operatively connect the controller to provide feedback for controlling the variable displacement mechanism. A pressure sensor can be operatively connected to the outlet line to generate sensor output indicative of pressure in the outlet line. The pressure sensor can be operatively connected to the controller for active control of the variable displacement mechanism and/or of the BPV based on pressure in the outlet line.

The sensor output can be indicative of flow demanded by the downstream system supplied by the outlet line. The controller can be configured to control position of the valve member of the BPV to maintain bypass flow through the BPV in the second condition wherein the controller governs the bypass flow through the BPV according to $$BF = PF - DSFD$$

wherein BF is flow through the BPV, PF is flow through the VDP, and DSFD is flow demanded by the downstream system supplied by the outlet line as indicated by the sensor output.

A flow sensing valve (FSV) can be connected in the outlet line. The FSV can include a sensor configured to generate sensor data indicative of flow out of the outlet line. The FSV can include an FSV inlet, an FSV outlet, and a valve member. A biasing member can bias the valve member in a first direction. Pressure of flow through the FSV from the FSV inlet to the FSV outlet can bias the valve member in a second direction opposite the first direction.

The sensor can include a position sensor operatively connected to monitor position of the valve member in the FSV to generate the sensor data. The FSV can include a pressure port on a side of the valve member opposite from the FSV inlet and the FSV outlet. A pressure line can connect the FSV outlet in fluid communication with the pressure port.

A BPV control line can connect the BPV in fluid communication with the inlet line through a first fixed throttle. A first MPSOV line can connect the MPSOV in fluid communication with the BPV control line. A second MPSOV line can connect the MPSOV to the outlet line for fluid communication. An MPSOV control line can connect the MPSOV in fluid communication with the inlet line through a fixed throttle. A solenoid valve (SOL) can be connected in fluid communication with the outlet line and with the MPSOV control line for actuating the MPSOV between first and second states. The MPSOV can include an MPSOV valve member with a first position in the MPOV that disconnects the first and second MPSOV lines from being in fluid communication and blocks flow through the outlet line, and a second position that connects the first and second MPSOV lines in fluid communication and allows flow though the outlet line.

A method includes receiving sensor feedback from a flow sensing valve (FSV) indicative of flow demanded by a downstream system supplied from an outlet line of a variable displacement pump (VDP). The method includes controlling a bypass valve (BPV) with an MPSOV to recirculate flow from the outlet line to an input line of the VDP in the event of the sensor feedback dropping below a predetermined low threshold of flow through the VDP, wherein the MPSOV is connected to selectively shut off flow in the outlet line.

The method can include controlling the BPV to recirculate flow from the outlet line to the inlet line at a constant base recirculation rate in the event of flow demanded by the downstream system being at or above the predetermined low threshold of flow through the VDP. The base recirculation rate can be zero recirculation flow. The method can include receiving pressure data from a pressure sensor in the outlet line. Controlling the BPV to recirculate flow can include controlling the BPV based at least in part on the pressure data. Controlling the BPV to recirculate flow can include governing the bypass flow through the BPV according to $$BF = PF - DSFD$$

wherein BF is flow through the BPF, PF is flow through the VDP, and DSFD is flow demanded by the downstream system supplied by the outlet line as indicated by the sensor feedback. The method can include receiving data from a sensor indicative of position of a valve member of the BPV. Controlling the BPV can include controlling the BPV based on position of the valve member.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
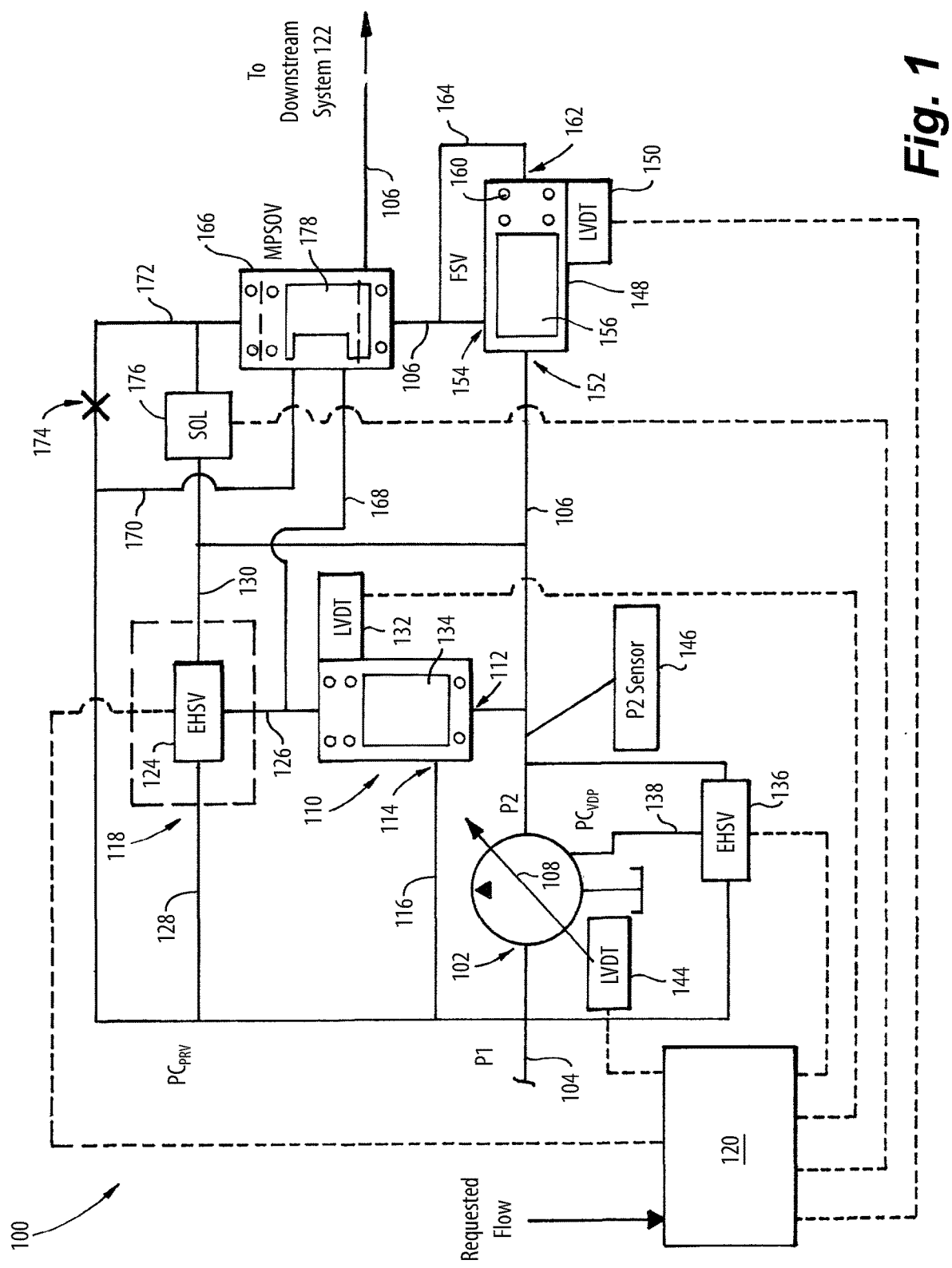
FIG. 1 is a schematic view of an embodiment of a system constructed in accordance with the present disclosure, showing the connections of the variable displacement pump (VDP) and a bypass valve (BPV), with the minimum pressure and shutoff valve (MPSOV) for shutting of flow to the downstream systems such as a gas generator of a gas turbine engine, with active control of the BPV.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to provide high turn down ratios for variable displacement pumps, and for control of the same, such as for use in supplying fuel to gas generators in aircraft engines.

The system 100 includes a variable displacement pump (VDP) 102 in fluid communication with an inlet line 104 and with an outlet line 106. The VDP 102 includes a variable displacement mechanism 108 configured to vary pressure to the outlet line 106. A bypass valve (BPV) 110 includes a BPV inlet 112 in fluid communication with the outlet line 106, and a BPV outlet 114 in fluid communication with a bypass line 116 that feeds into the inlet line 104 upstream of the VDP 102. An actuator 118 is operatively connected to control the BPV 110 to vary flow from the BPV inlet 112 to the bypass line 116. A flow sensing valve (FSV) 148 is connected in the outlet line 106. The FSV 148 includes a sensor 150, such as a linear variable differential transformer (LVDT), configured to generate sensor data indicative of flow out of the outlet line 106 to the downstream system 122 supplied by the outlet line 106.

A controller 120 is operatively connected to the actuator 118 to control recirculation flow passed through the BPV 110 based on the sensor data and based on a predetermined low threshold of flow through the VDP 102. The downstream system 122 can be a combustor, augmenter, or other gas generator of a gas turbine engine, for example. The low threshold of flow of the VDP 104 can be the threshold below which the VDP 104 cannot self-lubricate, or other design requirements for low or minimum flow. The BPV outlet 114 can be the only outlet of the BPV 110 so all flow through the BPV 110 from the BPV inlet 112 is supplied to the BPV outlet 114.

The controller 120 is configured, e.g. including analog circuitry, digital logic, and/or machine readable instructions, to control the BPV 110 to maintain a baseline flow through the BPV 110 under a first condition wherein requested flow from the downstream system 122 is above than the predetermined low threshold. The controller 122 is configured to control the BPV 110 to increase the flow through the BPV 110 above the baseline flow for a second flow condition wherein requested flow from the downstream system 122 is at or below the predetermined low threshold.

The actuator 118 includes a first electrohydraulic servo valve (EHSV) 124 that is connected in fluid communication with the BPV 110 by a first control line 126. The first EHSV 124 is connected in fluid communication with both the inlet line 104, by way of the recirculation line 116, and with the outlet line 106 through respective connection lines 128, 130. The first EHSV 124 is operatively connected to the controller 120 for active control of the first EHSV 124 to actuate the BPV 110.

A minimum pressure shutoff valve (MPSOV) 166 is connected in fluid communication with the outlet line 106 downstream of the FSV 148, configured to block flow through the outlet line 106 for shutoff of flow from the outlet line to the downstream system 122, e.g. to shut off flow to fuel injectors or the like. The MPSOV 166 is connected in fluid communication with the BPV 110 for triggering recirculation through the BPV 110.

Figure 2:
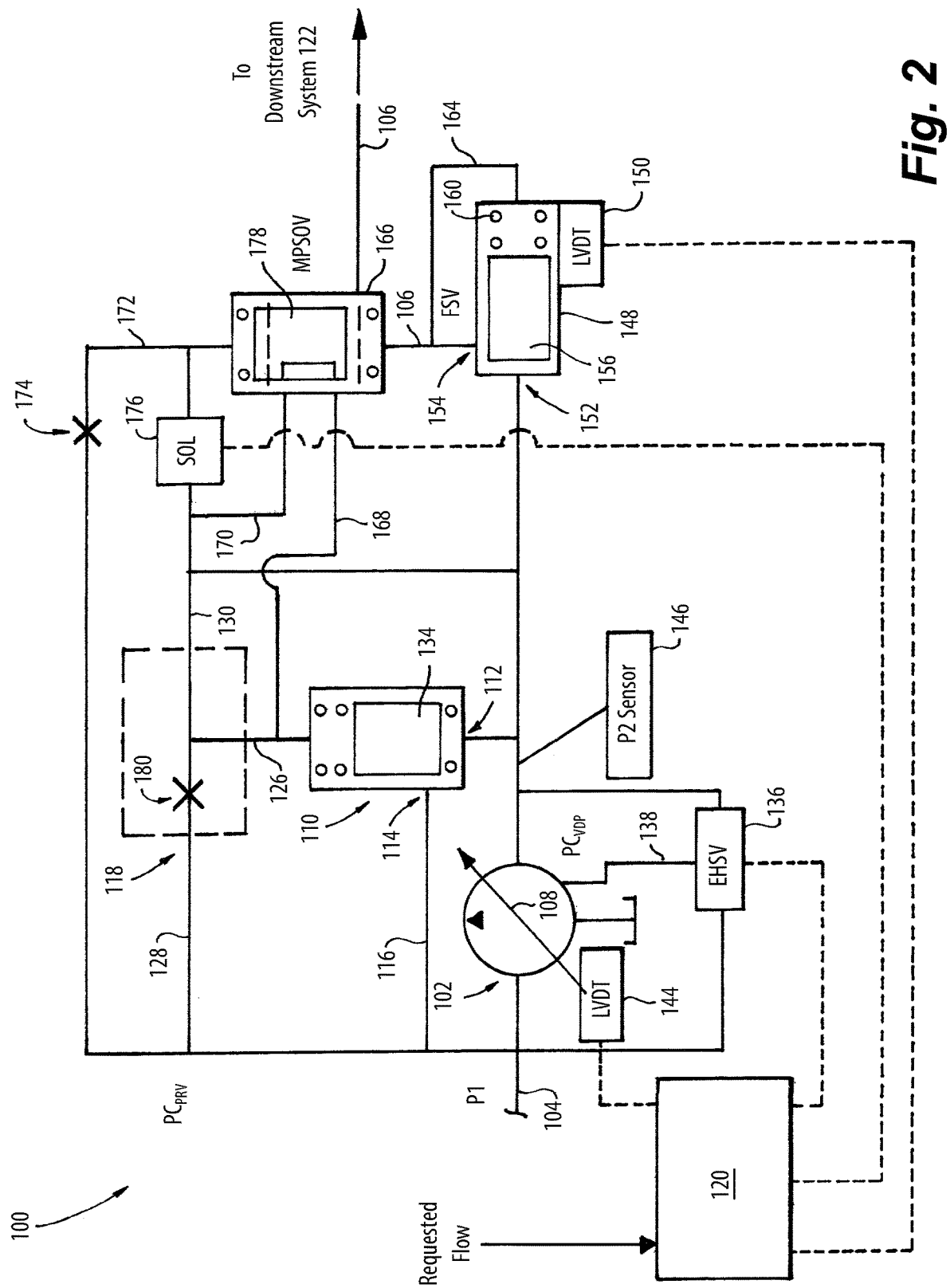
FIG. 2 is a schematic view of another embodiment of the system of FIG. 1, showing the MPSOV connected with passive control of the BPV.

A first MPSOV line 168 connects the MPSOV 166 to the first control line 126 for fluid communication. A second MPSOV line 170 connects the MPSOV 166 to the inlet line 104 for fluid communication. An MPSOV control line 172 connects the MPSOV 166 in fluid communication with the inlet line 104 through a fixed throttle or orifice 174. A solenoid valve (SOL) 176 is connected in fluid communication with the outlet line 106 and with the MPSOV control line 172 for actuating the MPSOV 166 between first and second states. The SOL 176 is connected to the controller 120 for control of the MPSOV 166 by the controller 122. The MPSOV 166 includes an MPSOV valve member 178 with a first position in the MPOV 166 that connects the first and second MPSOV lines 168, 170 in fluid communication and blocks flow through the outlet line to shut off flow to the downstream systems. The second position of the valve member 178 is schematically indicated in FIG. 2 with dashed lines inside the MPSOV 166. In this second position, the valve member 178 blocks fluid communication of the first and second MPSOV lines 168, 170 and allows flow though the outlet line 106 to the downstream system 122.

In the first position, the MPSOV 166 connects BPV 110 to inlet line 104. When a downstream system 122 such as a gas generator is shut down but the VDP 102 is still spinning, e.g. when a gas turbine engine is shut off but is still spooling down in speed, the VDP 102 needs a safe means to recirculate flow until the pump speed has reached 0 rpm. A high pressure relief valve can be included for to protection from overpressurization, but it is better for the VDP 102 not to go into high pressure relief every time downstream flow is turned off, since that would impose excess wear and tear on the VDP 102.

While the MPSOV 166 has an infinite number of positions across its stroke, the timing of the line 168 relative to valve stroke is such that as soon as the MPSOV 166 beings to open, the outlet port to the outlet line 106 (leading to the downstream system 122) is shut off. This allows the EHSV 124 to then control the BPV 110 to modulate bypass flow. When the port is open, the flow capacity of the line is greater than the EHSV 124 can provide to the circuit thereby rendering the EHSV 124 unable to raise the pressure above the inlet pressure plus some minor amount for plumbing losses. So the BPV 110 is controlled by the balance of pump outlet pressure versus the sum of inlet pressure and spring force in the BVV 110. So at almost all positions above the closed position of the MPSOV 166, the EHSV 124 can open the BPV 110 to cause a flow split between BPV 110 and the FSV 148. This can be utilized any time demanded flow is less than pump minimum flow or any time engine power is rapidly cut to stabilize the demand flow while the fuel system readjusts, for example.

A first position sensor 132, such as a linear variable differential transformer (LVDT), is operatively connected to the BPV 110 to provide sensor output indicative of position of a valve member 134 of the BPV 110 within the BPV 110. The first position sensor 132 is operatively connect the controller 120 to provide feedback for controlling the BPV 110. A second EHSV 136 is connected in fluid communication with the variable displacement mechanism 108 by a second control line 138 for control of flow through the VDP 102. The second EHSV 136 is connected in fluid communication with both the inlet line 104 and with the outlet line 106 through respective connection lines 140, 142. The second EHSV 136 is operatively connected to the controller 120 for active control of the second EHSV 136 to actuate the variable displacement mechanism 108 to control flow through the VDP 108. A second position sensor 144, such as an LVDT, is operatively connected to the variable displacement mechanism 108 to provide sensor output indicative of position of the variable displacement mechanism 108, wherein the second position sensor 144 is operatively connect the controller 120 to provide feedback for controlling the variable displacement mechanism 108.

A pressure sensor 146 is operatively connected to the outlet line 106 to generate sensor output indicative of pressure in the outlet line 106. The pressure sensor 146 is operatively connected to the controller 120 for active control of the variable displacement mechanism 108 and/or of the BPV 110 based on pressure in the outlet line 106. The sensor output of sensor 150 is indicative of flow demanded by the downstream system 122. The controller 122 is configured to control position of the valve member 134 of the BPV 110 to maintain bypass flow through the BPV in the second condition, i.e. when recirculation through the BPV 110 is needed because flow demanded by the downstream system 122 drops below the predetermined low threshold for flow through the VDP 102. In this second condition, the controller 120 governs the bypass flow through the BPV 110 according to $$BF = PF - DSFD$$

wherein BF is flow through the BPV 110, PF is flow through the VDP 102 (e.g. as indicated by sensors 144 and/or 146), and DSFD is flow demanded by the downstream system 122 as indicated by the sensor output of the sensor 150. In the first condition, e.g. when flow demanded by the downstream system 122 is at or above the predetermined low threshold for flow through the VDP 112, the controller 120 controls the BPV 110 to recirculate flow from the outlet line 106 to the inlet line 102 at a constant base recirculation rate. The base recirculation rate can be zero recirculation flow.

The FSV 148 includes an FSV inlet 152, an FSV outlet 154, and a valve member 156 that moves inside the FSV 148 based on how much pressure is acting on the valve member 156. A biasing member 158 biases the valve member 160 in a first direction, e.g. the biasing member 160 can bias the valve member to the left as oriented in FIG. 1. Pressure of flow through the FSV 148 from the FSV inlet 152 to the FSV outlet 154 biases the valve member 156 in a second direction opposite the first direction, e.g. to the right as oriented in FIG. 1. The sensor 150 includes a position sensor operatively connected to monitor position of the valve member 156 in the FSV 148 to generate the sensor data indicative of that position. The FSV 148 includes a pressure port 162 on a side of the valve member 156 opposite from the FSV inlet 152 and the FSV outlet 154. A pressure line 164 connects the FSV outlet 154 in fluid communication with the pressure port 162. The pressure port 162 of the FSV 148 connects the backside of the FSV 148 to the downstream pressure in the outlet line 106, via the pressure line 164. The pressure balance on the FSV 148 is pump outlet pressure versus the sum of pressure from FSV outlet pressure (via pressure line 164) and from the spring force from biasing member 160. The biasing member 160 creates a constant pressure drop across the FSV 148 to allow for the controller 120 to calculate flow across the FSV 120.

FIG. 1 shows system 100 configured for active control of the BPV 110. With reference now to FIG. 2, system 100 is shown configured for passive control of the BPV 110, where the other components similarly numbered are similar in operation to those described above with respect to FIG. 1 except as noted in the following with reference to FIG. 2.

With reference now to FIG. 2, the BPV control line 126 connects the BPV 110 in fluid communication with the inlet line 104 through a first fixed throttle or orifice 180. The actuator 118 in this case includes the BPV control line 126 and the fixed throttle or orifice 180, and the first MPSOV line 168 that connects the MPSOV in fluid communication with the BPV control line 126 for passive control of the BPV 110. The second MPSOV line 170 connects the MPSOV 166 to the outlet line 106 for fluid communication. The MPSOV control line 172 connects the MPSOV 166 in fluid communication with the inlet line 104 through the second fixed throttle or orifice 174. The SOL 176 is connected in fluid communication with the outlet line 106 and with the MPSOV control line 172 for actuating the MPSOV 166 between first and second states. The MPSOV 166 in this configuration includes an MPSOV valve member 178 with a first position in the MPOV 166 that disconnects the first and second MPSOV lines 168, 170 from being in fluid communication to allow bypass flow through the BPV 110 and to block flow through the outlet line 106 to shut off flow to the downstream systems 122. The first position of the valve member 178 is indicated in FIG. 2 with the dashed lines inside the MPSOV 166. The valve member 178 as configured in FIG. 2 has a second position that connects the first and second MPSOV lines 168, 170 in fluid communication to shutoff bypass flow through the BPV 110 and to allow flow though the outlet line 106, e.g. to supply the downstream systems 122.

The low threshold flow for the VDP 102 can either be handled by the VDP 102 itself, e.g. for applications where the VDP low flow threshold or requirement is less than the designed low threshold for fuel delivery to the downstream system 122, or via an actively controlled BPV 110, e.g. in applications where the low flow requirement or threshold for the VDP 102 is greater than the low flow threshold designed for fuel delivery to the downstream system 122. An FSV 148 can be used to determine flow sent to downstream systems 122, e.g. gas generators, augmenters, or the like. An MPSOV 178 is used to set the low pressure threshold for shutoff and to provide fast shut-off response. The MPSOV 178 can also trigger actuation of the BPV 110 for pump recirculation.

Systems and methods as disclosed herein provide various potential benefits including the following. There can be a reduction in valve count. The metering system can be faster than legacy systems, e.g. where a metering valve controls pressure control valve (PCV) which controls pump displacement or the like.

The methods and systems of the present disclosure, as described above and shown in the drawings, provide for high turn down ratios for variable displacement pumps, and for control of the same, such as for use in supplying fuel to gas generators in aircraft engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a variable displacement pump (VDP) in fluid communication with an inlet line and with an outlet line, wherein the VDP includes a variable displacement mechanism configured to vary pressure to the outlet line;
   a bypass valve (BPV) including a BPV inlet in fluid communication with the outlet line, and a BPV outlet in fluid communication with a bypass line that feeds into the inlet line upstream of the VDP;
   a minimum pressure shutoff valve (MPSOV) connected in fluid communication with the outlet line, configured to block flow through the outlet line for shutoff, wherein the MPSOV is connected in fluid communication with the BPV for triggering recirculation through the BPV;
   an actuator operatively connected to control the BPV to vary flow from the BPV inlet to the bypass line;
   a flow sensing valve (FSV) connected in the outlet line, wherein the FSV includes a sensor configured to generate sensor data indicative of flow out of the outlet line; and
   a controller operatively connected to the actuator to control recirculation flow passed through the BPV based on the sensor data and based on a predetermined low threshold of flow through the VDP.

2. The system as recited in claim 1, wherein the BPV includes no outlets other than the BPV outlet so all flow through the BPV is supplied to the BPV outlet.

3. The system as recited in claim 1, wherein the controller is configured to:
   control the BPV to maintain a baseline flow through the BPV under a first condition wherein requested flow from a downstream system is above the predetermined low threshold, and
   control the BPV to increase the flow through the BPV above the baseline flow for a second flow condition wherein requested flow from the downstream system is at or below the predetermined low threshold.

4. The system as recited in claim 3, further comprising:
   a first electrohydraulic servo valve (EHSV) connected in fluid communication with the BPV by a first control line, wherein the first EHSV is connected in fluid communication with both the inlet line and with the outlet line through respective connection lines, and wherein the first EHSV is operatively connected to the controller for active control of the first EHSV to actuate the BPV;
   a first MPSOV line connecting the MPSOV to the first control line for fluid communication;
   a second MPSOV line connecting the MPSOV to the inlet line for fluid communication;
   an MPSOV control line that connects the MPSOV in fluid communication with the inlet line through a fixed throttle; and a solenoid valve (SOL) connected in fluid communication with the outlet line and with the MPSOV control line for actuating the MPSOV between first and second states, wherein the MPSOV includes an MPSOV valve member with a first position in the MPOV that connects the first and second MPSOV lines in fluid communication and blocks flow through the outlet line, and a second position that blocks fluid communication of the first and second MPSOV lines and allows flow though the outlet line.

5. The system as recited in claim 4, wherein a first position sensor is operatively connected to the BPV to provide sensor output indicative of position of a valve member of the BPV, wherein the first position sensor is operatively connected to the controller to provide feedback for controlling the BPV.

6. The system as recited in claim 5, further comprising a second EHSV connected in fluid communication with the variable displacement mechanism by a second control line for control of flow through the VDP, wherein the second EHSV is connected in fluid communication with both the inlet line and with the outlet line through respective connection lines, and wherein the second EHSV is operatively connected to the controller for active control of the second EHSV to actuate the variable displacement mechanism.

7. The system as recited in claim 6, wherein a second position sensor is operatively connected to the variable displacement mechanism to provide sensor output indicative of position of the variable displacement mechanism, wherein the second position sensor is operatively connected to the controller to provide feedback for controlling the variable displacement mechanism.

8. The system as recited in claim 7, further comprising a pressure sensor operatively connected to the outlet line to generate sensor output indicative of pressure in the outlet line, wherein the pressure sensor is operatively connected to the controller for active control of the variable displacement mechanism and/or of the BPV based on pressure in the outlet line.

9. The system as recited in claim 8, wherein the sensor output is indicative of flow demanded by the downstream system supplied by the outlet line, and wherein the controller is configured to control position of the valve member of the BPV to maintain bypass flow through the BPV in the second condition wherein the controller governs the bypass flow through the BPV according to $$BF = PF - DSFD$$

wherein BF is flow through the BPV, PF is flow through the VDP, and DSFD is flow demanded by the downstream system supplied by the outlet line as indicated by the sensor output.

10. The system as recited in claim 1, wherein the FSV includes an FSV inlet, an FSV outlet, and a valve member, wherein a biasing member biases the valve member in a first direction, and wherein pressure of flow through the FSV from the FSV inlet to the FSV outlet biases the valve member in a second direction opposite the first direction.

11. The system as recited in claim 10, wherein the sensor includes a position sensor operatively connected to monitor position of the valve member in the FSV to generate the sensor data.

12. The system as recited in claim 11, wherein the FSV includes a pressure port on a side of the valve member opposite from the FSV inlet and the FSV outlet, wherein a pressure line connects the FSV outlet in fluid communication with the pressure port.

13. The system as recited in claim 12, further comprising:
a BPV control line connecting the BPV in fluid communication with the inlet line through a first fixed throttle;
a first MPSOV line connecting the MPSOV in fluid communication with the BPV control line;
a second MPSOV line connecting the MPSOV to the outlet line for fluid communication;
an MPSOV control line that connects the MPSOV in fluid communication with the inlet line through a fixed throttle; and
a solenoid valve (SOL) connected in fluid communication with the outlet line and with the MPSOV control line for actuating the MPSOV between first and second states,
wherein the MPSOV includes an MPSOV valve member with a first position in the MPOV that disconnects the first and second MPSOV lines from being in fluid communication and blocks flow through the outlet line, and a second position that connects the first and second MPSOV lines in fluid communication and allows flow though the outlet line.

14. A method comprising:
receiving sensor feedback from a flow sensing valve (FSV) indicative of flow demanded by a downstream system supplied from an outlet line of a variable displacement pump (VDP);
controlling, by an actuator, a bypass valve (BPV) to vary flow from a BPV inlet to a bypass line;
fluidically communicating, by an MPSOV, with the BPV to recirculate flow from the outlet line to an input line of the VDP in the event of the sensor feedback dropping below a predetermined low threshold of flow through the VDP, wherein the MPSOV is connected to selectively shut off flow in the outlet line; and
directing, by a controller, the actuator to control recirculation flow passed through the BPV based on the sensor data and based on a predetermined low threshold of flow through the VDP.

15. A fuel metering system, the fuel metering system comprising:
a variable displacement pump (VPD) further comprising:
a VDP inlet fluidically connected to an inlet line; and
a VDP outlet fluidically connected to an outlet line;
a bypass valve (BPV) further comprising:
a BPV inlet fluidically connected to the outlet line downstream of the VDP;
a BPV outlet fluidically connected to the inlet line upstream of the VDP through a bypass line;
a valve member; and
a BPV port fluidically connecting the valve member to the bypass line through a BPV control line, wherein the BPV includes no outlets other than the BPV outlet so all flow through the BPV inlet is supplied to the BPV outlet; and
a minimum pressure shutoff valve (MPSOV) further comprising:
an MPSOV inlet fluidically connected to the VDP outlet; and
an MPSOV outlet fluidically downstream of the MPSOV inlet, and wherein the MPSOV is connected in fluid communication with the BPV for triggering recirculation through the BPV.

16. The metering fuel system of claim 15, further comprising:
  a flow sensing valve (FSV) fluidically connected to the outlet line between the VDP and the MPSOV, wherein the FSV comprises:
    an FSV inlet fluidically connected to the VDP outlet;
    an FSV outlet fluidically connected to the MPSOV inlet;
    a valve member; and
    a pressure port fluidically connecting a control side of the valve member to the outlet line through a pressure line.

17. The fuel metering system of claim 16, wherein the MPSOV further comprises:
  an MPSOV valve member;
  an MPSOV control port fluidically connecting the MPSOV valve member to the inlet line upstream from the VDP through an MPSOV control line;
  a first MPSOV port fluidically connecting the MPSOV valve member to the BPV control line through a first MPSOV line; and
  a second MPSOV port fluidically connecting the MPSOV valve member to the MPSOV control line through a second MPSOV line.

18. The fuel metering system of claim 17, further comprising:
  a electrohydraulic servo valve (EHSV) fluidically between the BPV port and the inlet line, wherein the EHSV is fluidically connected to the MPSOV control line; and
  a solenoid valve (SOL) fluidically connecting the EHSV to the MPSOV control line, wherein the SOL further comprises:
    a SOL inlet fluidically connected to the EHSV; and
    a SOL outlet fluidically connected to the MPSOV control line.

19. The fuel metering system of claim 17, further comprising:
  a solenoid valve (SOL) comprising:
    a SOL inlet; and
    a SOL outlet fluidically connected to the MPSOV control line; and
  a first orifice in the MPSOV control line fluidically between the MPSOV control port and the inlet line.

20. The fuel metering system of claim 17, further comprising:
  a solenoid valve (SOL) comprising:
    a SOL inlet; and
    a SOL outlet fluidically connected to the MPSOV control line;
  a first orifice in the MPSOV control line fluidically between the MPSOV control port and the inlet line; and
  a second orifice fluidically between the SOL inlet and the inlet line.

* * * * *